US006904939B2

(12) United States Patent
Jung et al.

(10) Patent No.: US 6,904,939 B2
(45) Date of Patent: Jun. 14, 2005

(54) FLEXIBLE TUBULAR PIPE FOR HYDROCARBON TRANSPORT WITH CARCASS CONSISTING OF AN ELONGATED ELEMENT STAPLED WITH A BAND IRON

(75) Inventors: Patrice Joël Louis Jung, La Mailleraye sur Seine (FR); François Dupoiron, Barentin (FR)

(73) Assignee: Technip France, (FR)

( * ) Notice: Subject to any disclaimer, the term of this patent is extended or adjusted under 35 U.S.C. 154(b) by 0 days.

(21) Appl. No.: 10/493,528

(22) PCT Filed: Oct. 16, 2002

(86) PCT No.: PCT/FR02/03547

§ 371 (c)(1),
(2), (4) Date: Apr. 22, 2004

(87) PCT Pub. No.: WO03/036152

PCT Pub. Date: May 1, 2003

(65) Prior Publication Data

US 2004/0261878 A1    Dec. 30, 2004

(30) Foreign Application Priority Data

Oct. 24, 2001   (FR)  .................................. 01 13748

(51) Int. Cl.[7] .............................................. F16L 11/16
(52) U.S. Cl. .................... 138/135; 138/134; 138/131; 138/139
(58) Field of Search .............................. 138/135, 134, 138/136, 131, 139, 138, 140

(56) References Cited

U.S. PATENT DOCUMENTS

| | | | | |
|---|---|---|---|---|
| 1,295,630 A | * | 2/1919 | Sundh | 138/122 |
| 1,900,512 A | * | 3/1933 | Madden | 138/109 |
| 2,402,497 A | * | 6/1946 | Johnson | 138/135 |
| 2,649,778 A | * | 8/1953 | Buffet | 138/131 |
| 2,763,292 A | * | 9/1956 | Rejeski | 138/131 |
| 5,158,112 A | * | 10/1992 | Wood | 138/135 |
| 5,778,941 A | | 7/1998 | Inada | 138/134 |
| 5,934,335 A | * | 8/1999 | Hardy | 138/131 |
| 6,006,788 A | * | 12/1999 | Jung et al. | 138/131 |
| 6,016,847 A | * | 1/2000 | Jung et al. | 138/131 |
| 6,098,667 A | * | 8/2000 | Odru | 138/134 |
| 6,145,546 A | * | 11/2000 | Hardy et al. | 138/136 |
| 6,354,333 B1 | * | 3/2002 | Dupoiron et al. | 138/135 |
| 6,415,825 B1 | * | 7/2002 | Dupoiron et al. | 138/127 |

FOREIGN PATENT DOCUMENTS

| | | |
|---|---|---|
| DE | 164 391 | 4/1902 |
| EP | 0 429 357 | 1/1994 |
| FR | 465 136 | 4/1914 |
| FR | 2 772 293 | 6/1999 |

* cited by examiner

Primary Examiner—Patrick Brinson
(74) Attorney, Agent, or Firm—Ostrolenk, Faber, Gerb & Soffen, LLP

(57) ABSTRACT

A flexible tubular pipe for hydrocarbon transport, comprising from inside to outside at least a carcass, an inner sheath, tensile armoring plies and an outer sheath, wherein the carcass is formed by winding of at least an anti-corrosive elongated metal element with large cross-section, with successive windings stapled with a thin anti-corrosive metal strip.

6 Claims, 3 Drawing Sheets

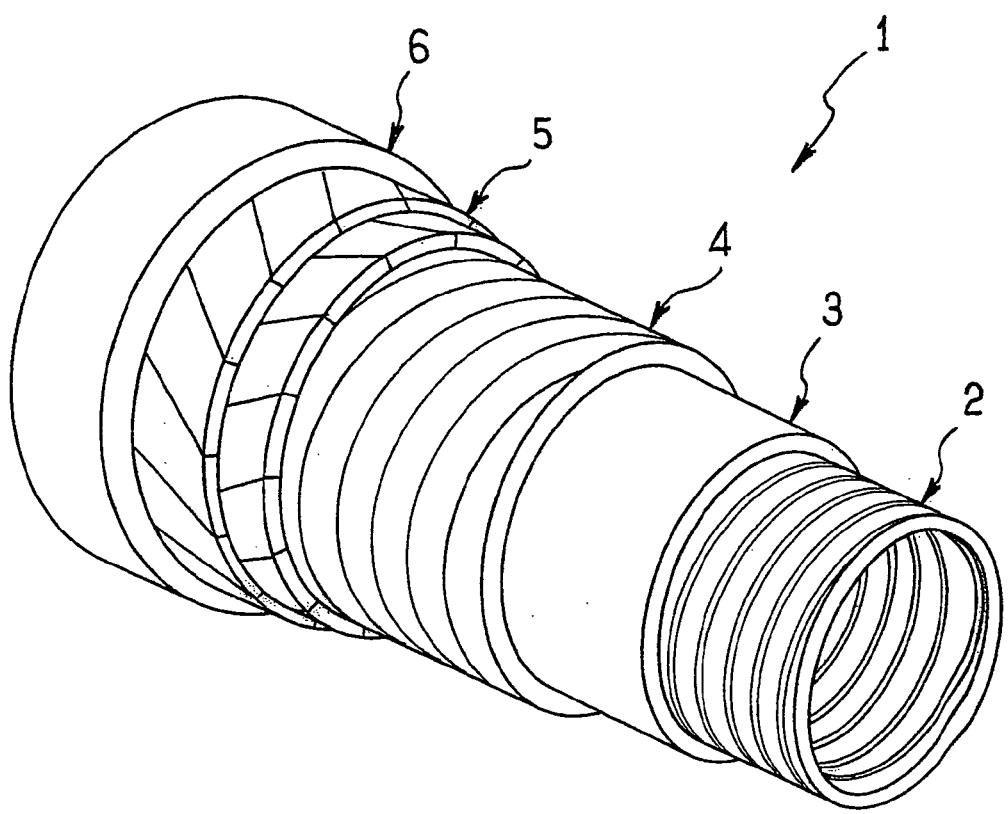
FIG_1
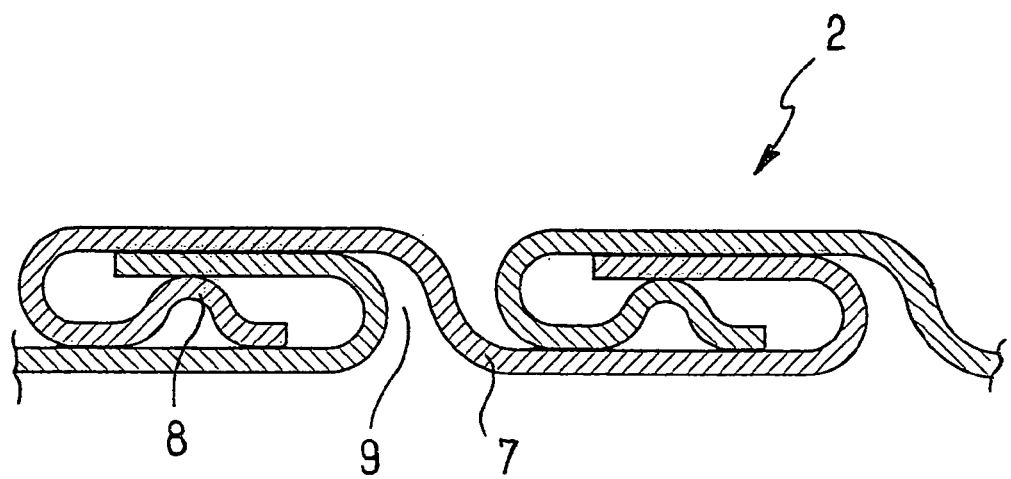
FIG_2

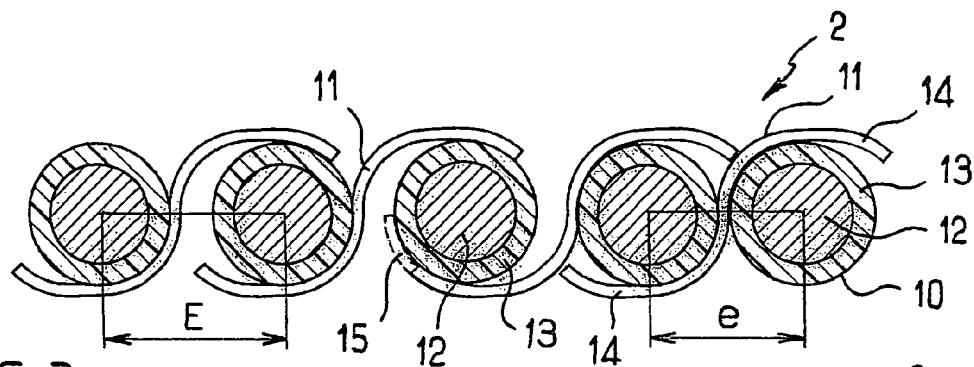
FIG_3
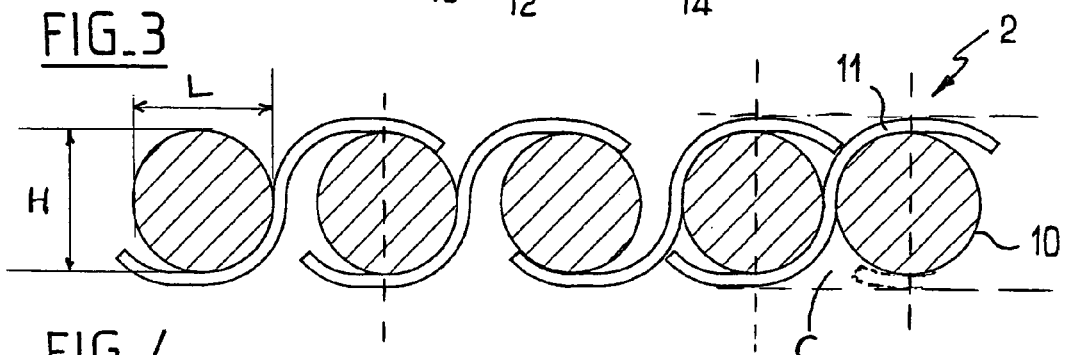
FIG_4
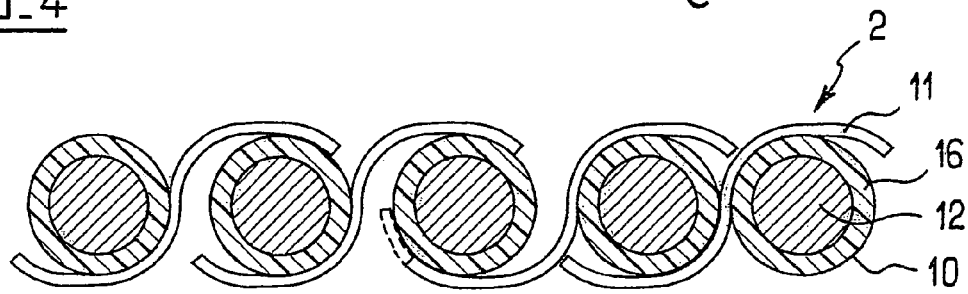
FIG_5
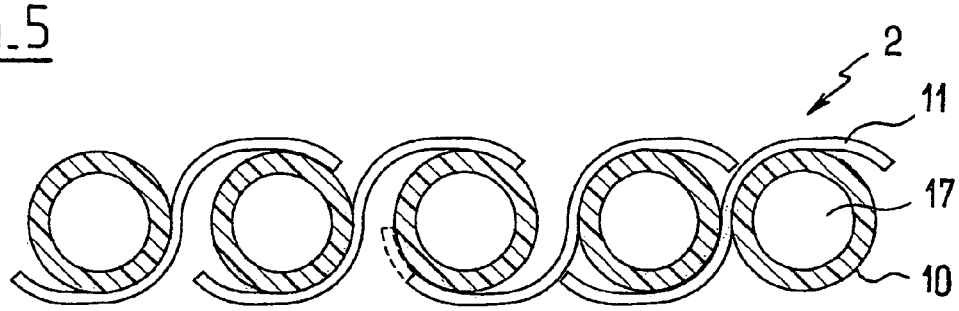
FIG_6
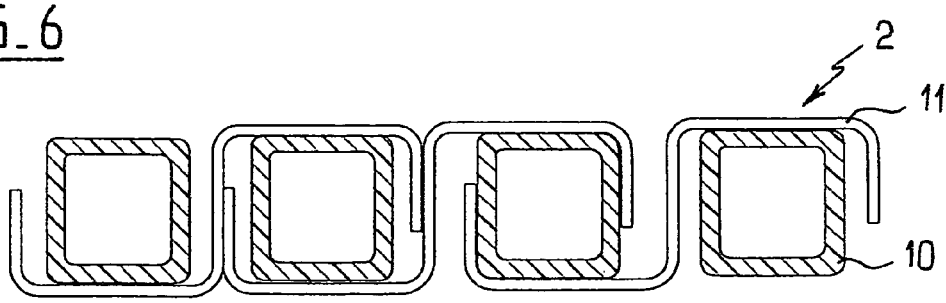
FIG_7

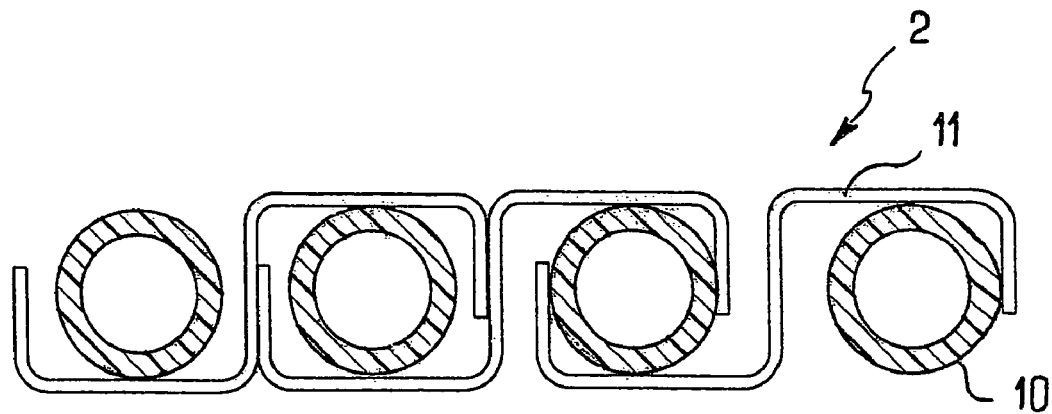
FIG_8
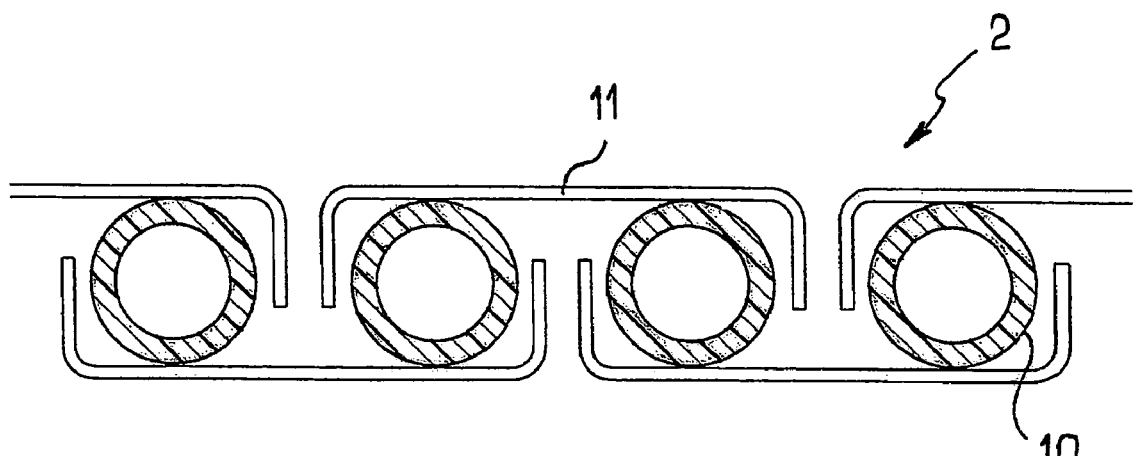
FIG_9

FLEXIBLE TUBULAR PIPE FOR HYDROCARBON TRANSPORT WITH CARCASS CONSISTING OF AN ELONGATED ELEMENT STAPLED WITH A BAND IRON

BACKGROUND OF THE INVENTION

The present invention relates to a flexible tubular pipe for transporting hydrocarbons, of the type comprising at least one carcass, an inner sealing sheath, tensile armour plies and an outer sealing sheath. Such a pipe, commonly called a "rough bore" when the carcass constitutes the inner layer of the pipe, can in particular be used for transporting hydrocarbons in offshore oil production installations. It may optionally include, in addition to these layers, other special layers, such as a pressure vault, a hoop layer, intermediate sheaths, etc.

The carcass is, as will be recalled in the API 17J recommendations by the American Petroleum Institute, a tubular layer, in principle the inner layer, formed from an interlocked metal winding intended essentially to prevent the collapse of the inner sealing sheath or of the pipe in the absence of internal pressure in the pipe, owing to the effect of the external pressure, the pressure generated by the tensile armour plies or even the external mechanical loads (in particular in the gripping members when laying the pipe). Sometimes, the carcass may constitute an external layer in order to protect the outer surface of the pipe.

The carcass is conventionally made of a corrosion-resistant metal strip, generally having a profile having a shape, in cross section, similar to that of a recumbent S and wound so as to produce interlocked turns. Various proposals have already been made for improving the performance of a carcass. Thus, reference may be made to document EP 0 429 357 by the Applicant, showing a carcass whose constituent metal strip comprises a corrugation forming a bearing structure that increases the height of the cross section, and therefore the moment of inertia, improving the resistance of the carcass to collapse. According to document FR 2 780 482, also in the name of the Applicant, the mechanical properties of the carcass are improved by carrying out a prior work-hardening operation on the constituent strip.

In the case of current carcasses made of interlocked (recumbent S) strip of the type described in document EP 0 429 357, the mechanical properties governing resistance to collapse are limited for a given pipe diameter. This is because the diameter of the pipe imposes, in the case of the S-section in question, a maximum thickness of the strip that can be used. This thickness is limited, in particular because of the S-section, which it is impossible to wind over a given diameter for strip thicknesses greater than the limiting thickness. Since the moment of inertia of the S-section producing the carcass depends in particular on the overall thickness of the latter, and therefore on the thickness of the strip used, this thickness has a maximum for a given diameter (and therefore there is a maximum thickness of the strip that can be used). Consequently, for a given pipe diameter, the carcass that can be used poses a limitation on its collapse resistance (inertia) characteristics. Since the design of a carcass depends directly on the hydrostatic pressure that exists at the depth at which the pipe is used, the latter being designed to be able to withstand the hydrostatic pressure that there would likely be in the annulus in the pipe if the sheath were punctured, each pipe diameter poses a limitation on the possible depth at which the pipe can be used, this limitation being tied to the strength of its carcass.

Moreover, such carcasses produced from interlocked S-sections also have other problems, these being in particular:
an inertia problem associated with a mean fill factor;
a cost problem associated with the cost of the raw material employed (generally stainless steel in order to be corrosion-resistant); and
a head loss problem due to the gaps, which may be substantial, between adjacent turns of the winding and which create discontinuities in the surface of the internal face of the carcass. These problems are greater when it is desired to have a high inertia and when a thick strip is used.

There are alternatives to winding a strip in order to produce a carcass, especially using Zeta or Teta-shaped wires interlocked by a U-section, as shown in document FR 2 772 293. However, the latter solution proves to be expensive and poses other problems, in particular a weight problem when the pipe is used at great depth.

There are also in the prior art carcasses made from spiralled wire, but these are in no way suitable for the type of applications envisioned here, especially on account of their inability to provide a local minimum inertia and therefore inability to ensure that the carcass has the desired resistance to collapsing.

Thus, the known carcasses of the prior art are unsatisfactory when it is desired to produce pipes intended to be used at great depth. They have problems either of cost and weight (profiled wire) or of a limitation in the diameter of the pipe that can be used for a given depth (interlocked S-shaped strip), as well as head loss problems.

SUMMARY OF THE INVENTION

The objective of the invention is therefore to propose a flexible pipe whose carcass is produced according to an alternative solution which does not present the drawbacks of the aforementioned solutions.

This objective is achieved according to the invention by means of a flexible tubular pipe for transporting hydrocarbons, of the type comprising at least a carcass, an inner sheath, tensile armour plies and an outer sheath, characterized in that the carcass is formed by a winding of at least one corrosion-resistant elongate metal element of large cross section and interlocked by a thin corrosion-resistant metal strip.

The term "elongate element" is understood to mean a compact element of the wire or tube type, as opposed to a flat element of the strip type. The cross section of the wire may be round, rectangular or square and the ratio of its height to its width is greater than 0.1.

The combination of an elongate element and a strip allows a thinner strip to be used in order to obtain an inertia similar to that obtained with the interlocked S-shaped strip; thus, for a given pipe diameter, it is possible to produce a winding having a much higher inertia with an elongate element of large cross section combined with a thin strip, since according to the invention the inertia is no longer limited by the strip thickness associated with the winding diameter. Thus, by combining the strip with an elongate element, it is possible, for a given pipe diameter, to considerably increase the inertia of the carcass that can be produced compared with the known carcasses. Thus, for each pipe diameter, its capability of withstanding great depths is increased.

Since the cost of stainless steel wire is less than the cost of stainless steel strip, combining the elongate element with the thin strip makes it possible to lower the cost of the carcass relative to a stainless steel strip carcass of the prior art. In addition, instead of stainless steel wire, it is possible to use other corrosion-resistant materials such as a sheathed steel wire, the manufacturing cost of which is even more attractive, thus further reducing the cost of the carcass. The coating on the wire may be of any type especially a thermoplastic coating, such as a polyethylene, polyamide or polyvinylidene floride (PVDF). It may also be made of a thermoset, such as an epoxy or the like.

It is also possible to use non-metallic yarns, such as those made of a composite (resin/carbon or glass fiber). Such yarns have the advantage of being lighter and thus lightening the structure, this being important especially in the case of pipes designed for great depth.

In the combination of the elements of the invention, the elongate element serves, on the one hand, to partly provide the inertia of the section by providing its material and, on the other hand, to guarantee the height of the section. It allows the strip to bear on itself so as to guarantee the shape and profile of the strip, thus allowing said strip to fully contribute to increasing the inertia of the section. The strip provides the interlocking, in order to keep the inter-turn gap between a minimum value and a maximum value, thus guaranteeing locally a minimum inertia of the carcass, and it also provides a large contribution to the inertia of the carcass. In addition, it substantially reduces the head loss problems associated with the gaps.

The use of a thin strip allows it to be bent to much smaller radii of curvature than with the strips used in the prior carcasses. Thus, since the thin strip has much smaller bending radii, the head losses associated with the gaps that would exist at the internal face of the carcass, especially because of the large radii of curvature of the adjacent strip turns, are, thanks to the invention, reduced.

The winding is of a true helical type, with a winding angle of less than 90°. A winding with a winding angle of 90° to the axis of the pipe, that is to say consisting of rings of strip and rings made of the elongate element, would be an extreme case outside the scope of the invention.

The elongate element is preferably a wire or tube made of stainless steel, of sheathed steel (by a plastic sheath, for example one made of a thermoplastic of the polyvinylidene fluoride (PVDF), polyethylene or polyamide type), or made of clad steel (i.e. clad with a metal such as titanium or nickel), or a non metallic material, such as a composite for example.

The cross section of the wire is preferably round, but it may be of a different shape, especially square, rectangular or other shape.

The cross section of the strip is preferably in the form of a rounded S, but it may be different, especially in the form of a square S. In other words, the cross section of the strip after profiling may have a rounded shape in the form of a recumberent S, but it may also be bent to small radii of curvature at only certain points, thus giving the strip what is called a square S shape.

The round wires may be combined with square S-shaped strips.

BRIEF DESCRIPTION OF THE DRAWINGS

Other advantages and features will become apparent upon reading the description that follows, with reference to the appended schematic drawings in which:

FIG. 1 is a perspective view of a pipe of the rough-bore type, to which the invention applies;

FIG. 2 is an enlarged schematic view of a longitudinal section of carcass of the prior art, produced by winding an S-shaped strip;

FIG. 3 is an enlarged schematic view of a longitudinal carcass section according to a first embodiment of the invention;

FIG. 4 is an enlarged schematic view of a longitudinal carcass section according to a second embodiment of the invention;

FIG. 5 is an enlarged schematic view of a longitudinal carcass section according to a third embodiment of the invention;

FIG. 6 is an enlarged schematic view of a longitudinal carcass section according to a fourth embodiment of the invention;

FIG. 7 is an enlarged schematic view of a longitudinal carcass section according to a fifth embodiment of the invention;

FIG. 8 is an enlarged schematic view of a longitudinal carcass section according to a sixth embodiment of the invention;

FIG. 9 is an enlarged schematic view of a longitudinal carcass section according to a seventh embodiment of the invention.

DESCRIPTION OF THE PREFERRED EMBODIMENTS

The flexible pipe 1 shown in FIG. 1 comprises, from the inside outward:

- a carcass 2 consisting of an interlocked metal winding so as to prevent the pipe from collapsing under the external pressure;
- an inner sealing sheath 3, made of a plastic, generally a polymer, resistant to the chemical action of the fluid to be transported;
- a pressure vault 4 mainly resistant to the pressure developed by the fluid in the sealing sheath and consisting of a short-pitch helical winding (that is to say one with a winding angle close to 90°) around the inner sheath of one or more interlocked (self-interlockable or otherwise) profiled metal wires. The profiled wires have a cross section in the form of a Z or T, or derivatives (teta or zeta) thereof, or in the form of a U or in the form of a I;
- at least one tensile armour ply 5 (and generally at least two crossed plies) wound with a long pitch; the lay angle measured along the longitudinal axis of the pipe is, for example, approximately equal to 55°; and
- an outer sealing and protective sheath 6 made of a polymer.

The pressure vault, intended essentially to withstand the internal pressure, is not necessary in all situations and, owing to the additional cost that it engenders, it is preferred to use a pipe without a pressure vault whenever the circumstances so allow. The invention applies to both cases.

FIG. 2 shows the construction of a carcass 2 known from document EP 0 429 357, made from a helical winding of a metal strip 7 shaped in the form of a flattened S and provided with a support corrugation 8. The gaps 9 appearing between the adjacent turns are the cause of the head loss in the flow of fluid through the pipe. The thickness of the strip 7 is generally equal to or greater than 2 mm.

FIGS. 3 to 7 represent various carcass embodiments comprising a wire or tube 10 interlocked by means of a thin strip 11 of S-shaped cross section.

In FIG. 3, the wire 10 is a round wire with a steel core 12 and a plastic sheath 13. The strip 11 has a cross section in the form of a round S, the two flanges 14 of which terminate in returns, which may be slight and barely enveloping, as shown by the solid lines, or possibly a little more enveloping around the wire 10, as shown for example by the extension 15 in dotted lines. In both cases, the strip 11 interlocks the wires 10, allowing a certain play needed for the flexibility of the flexible pipe. According to the invention, the thickness of the strip 11 is less than that of the strips used in the prior art. Advantageously, it is between 0.5 mm and 1.5 mm and may be chosen to be equal to 1 mm.

The term "thin strip" is understood to mean a strip whose thickness is advantageously less than 0.2 times the total height of the section (i.e. the height of the carcass) and preferably less than 0.1 times this height. The cross section of the elongate element advantageously has a width of greater than or equal to its height (L/H 1, cf. FIG. 4) and the fill factor (measured over one period and equal to the ratio of the area occupied by the envelope of the wire 10 to the area occupied by the strip 11 within a cell C, such as that shown in FIG. 4 bounded by the dashed lines) of the assembly comprising the thin strip and the elongate element of large cross section is greater than 0.4 and advantageously between 0.4 and 0.85. It may be noted that the transverse section of the elongate element represents at least 60% of the filling (total cross section) of the overall (strip+wire) section of the carcass.

In one particular embodiment, the spacing between wires may range from a minimum spacing "e" of 14 mm to a maximum spacing "E" of 17 mm.

FIG. 4 differs from FIG. 3 only by the fact that the wire 10 is made of a corrosion-resistant material such as stainless steel or certain alloys (nickel, titanium, etc.).

In FIG. 5, the wire 10 is a plated wire with a steel core 12 clad with a corrosion-resistant cladding 16 such as one, for example, made of titanium or other metal. In this case, the strip is advantageously of the same nature as the cladding used.

In FIG. 6, the elongate element 10 is a stainless steel tube, clad or plastic-coated for example, the inside 17 of which may serve for conveying liquids or gases, or for the passage of an electrical cable.

In FIG. 7, the elongate element 10 is of square cross section and the strip 11 has, after profiling, a cross section in the form of a square S.

In FIG. 8, the strip 11 is again of square S cross section, and the elongate element is hollow and circular.

According to FIG. 9, the elongate elements 10 are interlocked by a square U-shaped strip 11 in the form of two layers —an inner one and an outer one—that are imbricated in the turns, with an offset of one turn from one layer to another.

In the various embodiments of the invention illustrated, the elongate element has a round or square cross section. Of course, the shape of the cross section of the elongate element may also be ovoid or rectangular without thereby departing from the scope of protection of the invention.

What is claimed is:

1. A flexible tubular pipe for transporting hydrocarbons comprising from inside outward, in sequence, at least a carcass, an inner sheath, at least one tensile armour ply and an outer sheath wherein the carcass comprises a winding of at least one corrosion-resistant elongate metal element of a larger cross section in a succession of winding turns and a thin corrosion-resistant metal strip interlocking successive turns.

2. The pipe as claimed in claim 1, wherein the elongate element comprises a sheathed steel wire.

3. The pipe as claimed in claim 1, wherein the elongate element is selected from the group consisting of wires and tubes of round and square cross section, and made of stainless steel or steel clad with a corrosion-resistant material.

4. The pipe as claimed in claim 1, wherein the strip is a stainless steel strip having a cross section after profiling in the form of a round or a square S.

5. The pipe as claimed in claim 1, wherein the strip has a thickness of between 0.5 mm and 1.5 mm.

6. The pipe as claimed claim 1, wherein the strip has a thickness that is less than 0.2 times a total radial height of the carcass.

* * * * *